(12) United States Patent
Nachbar et al.

(10) Patent No.: US 6,793,180 B2
(45) Date of Patent: Sep. 21, 2004

(54) LIGHTER THAN AIR FOLDABLE AIRSHIP

(76) Inventors: Daniel Nachbar, 110 Pulpit Hill, Amherst, MA (US) 01002; John A. Fabel, 120 Pulpit Hill Rd., Amherst, MA (US) 01002

( * ) Notice: Subject to any disclaimer, the term of this patent is extended or adjusted under 35 U.S.C. 154(b) by 0 days.

(21) Appl. No.: 10/213,348

(22) Filed: Aug. 5, 2002

(65) Prior Publication Data

US 2004/0021037 A1 Feb. 5, 2004

(51) Int. Cl.[7] .................................................. B64B 1/08
(52) U.S. Cl. ........................ 244/125; 244/126; 244/128
(58) Field of Search .............................. 244/24, 30, 31, 244/125, 126, 128

(56) References Cited

U.S. PATENT DOCUMENTS

| | | | | |
|---|---|---|---|---|
| 3,384,328 A | * | 5/1968 | McGee | 244/31 |
| 3,971,533 A | * | 7/1976 | Slater | 244/30 |
| 4,084,771 A | * | 4/1978 | Creuzet | 244/31 |
| 4,102,519 A | * | 7/1978 | Crosby, Jr. | 244/125 |
| 4,326,681 A | | 4/1982 | Eshoo | |
| 4,382,417 A | * | 5/1983 | Talve | 114/102 |
| 4,762,295 A | * | 8/1988 | Yon, Jr. | 244/115 |
| 5,005,783 A | * | 4/1991 | Taylor | 244/97 |
| 5,071,090 A | * | 12/1991 | Takahashi et al. | 244/29 |
| 5,213,289 A | * | 5/1993 | Barresi | 244/145 |
| 5,285,986 A | * | 2/1994 | Hagenlocher | 244/97 |
| 5,333,634 A | | 8/1994 | Taylor | |
| 5,499,594 A | | 3/1996 | Bullock | |
| 5,697,579 A | * | 12/1997 | Hayashi | 244/31 |
| 5,823,468 A | | 10/1998 | Bothe | |
| 5,842,495 A | | 12/1998 | Egnew | |
| 6,021,795 A | | 2/2000 | Long | |
| 6,021,796 A | | 2/2000 | Vavra | |
| 6,056,240 A | | 5/2000 | Hagenlocher | |

OTHER PUBLICATIONS

L. Kort "Ein neues Luftschiff" (A New Airship) Zeitschrift fuer Flugtechnik und Motorluftschiffart (Journal of Flight Technology and Engine Airship Travel) vol 17, No. 16, 1926 Germany.

* cited by examiner

Primary Examiner—Michael J. Carone
Assistant Examiner—David Matz
(74) Attorney, Agent, or Firm—Daniel S. Coolidge

(57) ABSTRACT

A system and method for constructing an airship hull is described, comprising a plurality of flexible members disposed lengthwise about the perimeter of the airship skin. The flexible members can be held in place in sleeves on the skin of the airship. The ends of the flexible members are drawn toward one another by tensioning means, causing the members to bow outwardly from a central axis and providing a rigid structure for the skin.

36 Claims, 11 Drawing Sheets

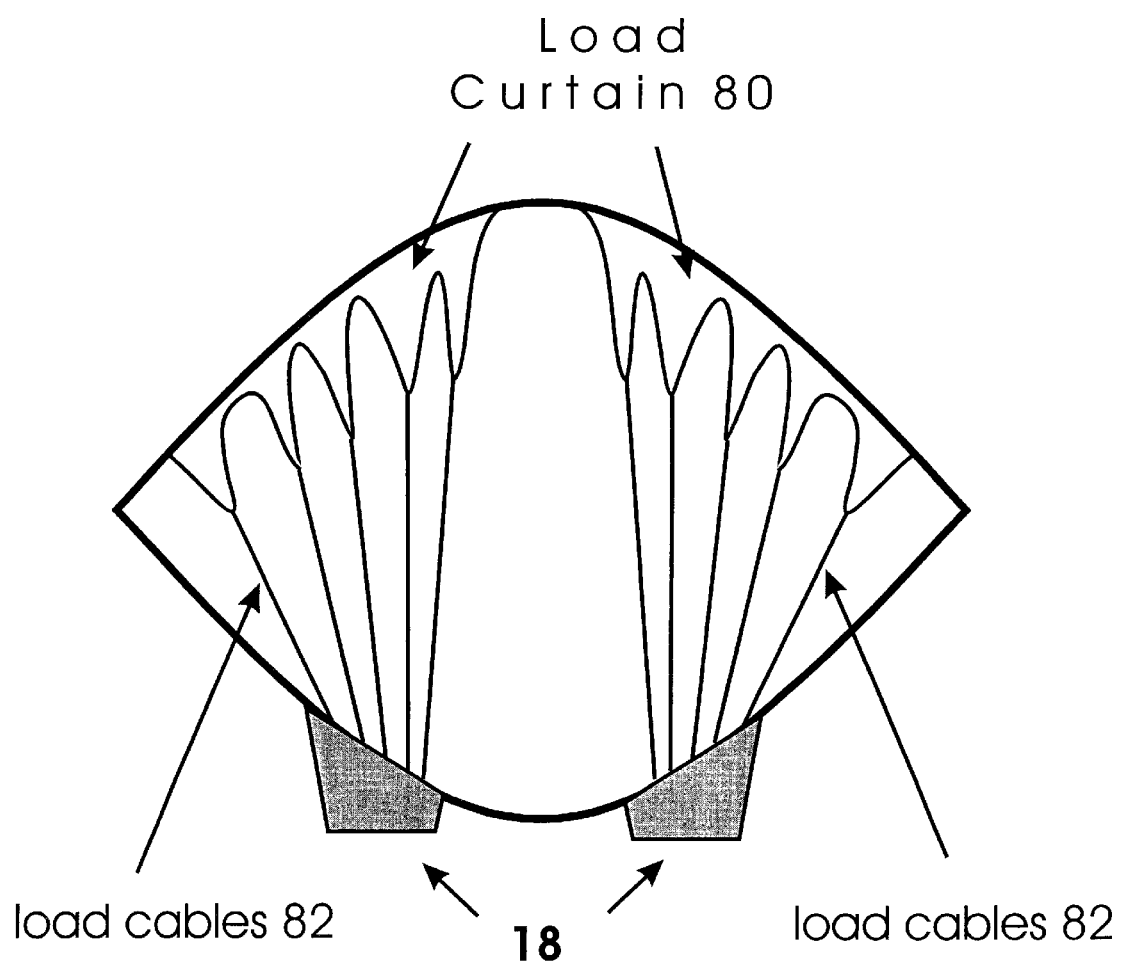

LIGHTER THAN AIR FOLDABLE AIRSHIP

TECHNICAL FIELD

The present invention relates to aircraft, and more particularly, relates to a lighter than air foldable airship hull.

BACKGROUND INFORMATION

There are two basic forms of lighter-than-air-craft: the balloon and the airship. Both are able to ascend into the sky and stay there because they contain a substance that is less dense than the air that surrounds them. The fundamental difference between the airship and the balloon is that an airship is powered and horizontally controllable while the balloon is neither. The altitude of a free-floating balloon can be regulated to a considerable degree by dropping ballast and venting gas or by allowing hot air to cool or to be heated, but lateral movement is determined solely by which way the wind blows.

At first, hot air was used to lift balloons. However, flight time was limited because of the heated air eventually cooled. Sustained hot-air ballooning did not become feasible until after World War II with the innovation of the propane burner, which permits reheating while the craft is aloft.

For more than a century the principal and preferred lifting substance for both balloons and airships was hydrogen, the lightest of the elements, despite it being highly dangerous because of its extreme flammability. It was not succeeded by helium (which although somewhat inferior to hydrogen in lifting strength will not burn) until a crash American research program beginning in 1917 developed means of extracting it cheaply in large quantities.

By the start of the First World War the airship had been developed into two main types—rigid and non-rigid (technically, the latter is more accurately described as pressure-rigid). Cylindrical in cross-section, both were given buoyancy by gas and motion by engine-driven propellers and were controlled by vertical rudders and horizontal elevators.

In the rigid type, a framework supports an external covering of fabric called the envelope, or skin. Within the framework are contained bags of gas. In the non-rigid airship, the shape of the envelope is maintained by the pressure of the gas that fills it; there is no framework. The rigid airship's control car and engines are suspended from the framework; in the non-rigid they are attached directly to or suspended directly from the envelope. (In some later rigid airships the engines were mounted internally, driving the propellers by transmission belts.)

The earliest airships were powered by steam engine, by human muscle and by electric motors. The airship, however, like the airplane, did not become a truly viable proposition until the advent of the internal combustion engine.

Rigid airships, also called dirigibles (and sometimes, although incorrectly, "zeppelins") can be used to transport freight. They can be relatively fast—significantly faster than a tractor and trailer combination—and have potentially high load carrying capacity They are economical: fuel consumption is negligible as compared to that of conventional aircraft. They can be landed in a variety of locations requiring no preexisting infrastructure (they could allow cargo to be loaded and unloaded in undeveloped areas that are served by nothing more than the equivalent of a pack-trail or logging road).

The use of dirigibles to transport cargo or passengers is not new, nor a concept just off the drawing board, still in need of extensive field-testing. However, early airships acquired a poor reputation for safety, perhaps undeservedly. Nevertheless, from about 1919 until 1937, when the 804 foot, 6.7 million cubic foot dirigible, the Hindenburg was destroyed by fire at the New Jersey landing field, dirigibles amassed an impressive number of successful flights, carrying both passengers and cargo.

After the Hindenburg disaster, the production of commercial airships was virtually discontinued. In recent years, about the only airships likely to be seen are small non-rigid advertising "blimps." However, since the days of the Hindenburg, substantial technological improvements have been made in the materials that can be used for airship construction. There are a number of light-weight high-strength, corrosion-resistant alloys and composites for hull structures. For the outer covering or skin, there now exist a variety of tough, durable fabrics. For the gas cell linings, there are a variety of impermeable synthetic films. The problem of the highly flammable hydrogen as the buoyancy gas has been overcome through the use of helium gas and hot air and the modern propane burner.

An inherent advantage of the airship over conventional aircraft is that they obtain their lift through the use of buoyancy: aerostatic lift. Conventional heavier-than-air aircraft use a powered aerodynamic lift (air flow over the wings). With lighter-than-air aircraft using helium or a combination of helium and hot air, the fuel cost of getting and keeping the airship aloft are negligible. Due to their ability to operate at lower speeds, the energy requirement to propel the buoyant airship is dramatically less than for conventional aircraft. In fact, the first mechanically driven airship (circa, 1852) was a 143-foot craft that was propelled at a speed of about 6 miles per hour by a 3-horsepower steam engine.

The advantages of fuel conservation are somewhat offset by the lower operating speed of the airship, which attains a maximum cruising speed up to about sixty miles per hour. In theory, higher speeds are obtainable, but fuel consumption increases disproportionately as speed is increased. However, considering the fact that dirigibles can be designed to carry a payload of as much as 500 tons, a speed of sixty miles per hour and the ability to be able to land most anywhere more than compensates for the slower speed compared to heavier than air aircraft, and a speed advantage over ocean cargo ships.

Since an airship can rise or descend vertically, no runway space is needed for takeoffs and landings. Once airborne, whether taking off or landing, it needs a clear approach; but on the ground all that is needed is level terrain—such as any ordinary field would provide—about twice the length of the craft, to permit movement around a mooring mast.

Hot air airships offer a compromise between the ease of use common to hot air balloons and the maneuverability of rigid airships. Basically, they are elongated hot air balloons with a propulsion engine and added tail fins and rudders. Most hot air airships flying today are pressurized models. The internal pressure makes the envelope more rigid and prevents "denting" of the nose at higher speeds.

Airships can be used to carry bulky loads, of the kind that conventional carriers find economically unfeasible, over any kind of terrain—ice fields, large expanses of water and into continental interiors, as well as into regions that are undeveloped for surface vehicles. Through the use of winches for loading and unloading, crews of men and equipment could be lowered into logging operations, where logging is done in environmentally fragile areas. Logs could be "yarded" out without resorting to the construction and use of erosion-causing logging roads. Areas could be worked that might be accessible only at extremely high cost.

Since smaller power plants are required for airship propulsion than for that of power-lifted craft, pollution and noise are considerably decreased.

Another advantage of the airship is that, with vibration greatly decreased, it would find a use as a flying laboratory. Other suggested uses for the spacious, quiet craft are the transporting of persons for sightseeing or research.

Large-scale use of airships present some problems. The size of a hangar required to hangar conventional rigid airships is considerable. Another problem is the space and facilities needed for ground-handling the airship. The foremost problem of storage is the amount of space required to handle just a few airships. Although paved areas and runways are not needed, more land area is necessary to handle a few conventional rigid airships than would be needed for several airports.

Still another problem arises with helium-based airships during the loading and unloading of cargo. As cargo is unloaded from a hovering craft, ballast must be taken on or the buoyancy otherwise adjusted to compensate for the lower weight; and when goods are loaded, ballast must be released or additional buoyancy obtained.

Small, rigid airships could have application in personal transportation, but again, because of storage issues, have not hitherto been available. What is needed is a safe, airship which can be stored conveniently without the need for vast hangar space, and which can utilize a variety of lifting gasses. What is needed further is an airship that has a lightweight frame, yet with hard points to hold propulsion units, such as engines. What is further needed is an airship which can be conveniently disassembled and stowed in a relatively small space.

SUMMARY

A substantially rigid airship hull, and method of making the same, is described. The hull has a generally tubular skin, being closed at each end, and a number of flexible members running fore and aft to each end, which may be held in place at at least one point, or may be held in sleeves on the skin. The flexible members are held in tension by pulling the ends toward one another, causing the flexible members to bow outwardly and tension the skin about the flexible members, making a substantially rigid volume. The flexible members may be of wood, metal or fiber composites, and may be elliptical in cross section (including circular in the limiting case.)

The hull may be fitted with one or more gondolas, which may be internal or external to the skin, and which may be suspended from either end of the hull, or by use of one or more load curtains and slings. The hull may also be fitted with propulsion means mounted on a gondola or the surface of the hull. The hull may be fitted with control surfaces such as rudders and elevators, and may have fins to assist in course holding.

The aspect ratio of the hull may be improved by being fitted with a more aerodynamic stiff or solid cap on the fore end.

The airship may obtain lift from a less-dense-than-air gas, such as helium, or from heated air, or a combination of both. Means may be provided either externally or internally for heating the internal gasses and regulating lift.

The tension can be loosened on the flexible members, and the straightened members bo rolled up with the skin for storage. Alternatively, the flexible members may be removed and the skin folded. The flexible members may be made from two or more sections joined together at the ends.

BRIEF DESCRIPTION OF THE DRAWINGS

These and other features and advantages of the present invention will be better understood by reading the following detailed description, taken together with the drawings wherein:

FIGS. 6B, 6A and 6C are diagrams of supports for cargo gondolas according to the principles of the present invention.

DETAILED DESCRIPTION

An airship is described which combines the best of rigid airships without a large sacrifice of weight. The airship is provided with a lightweight yet rigid frame, and withstands dimpling quite well. It is scalable, thus suitable for small or large implementations.

Figure 1:
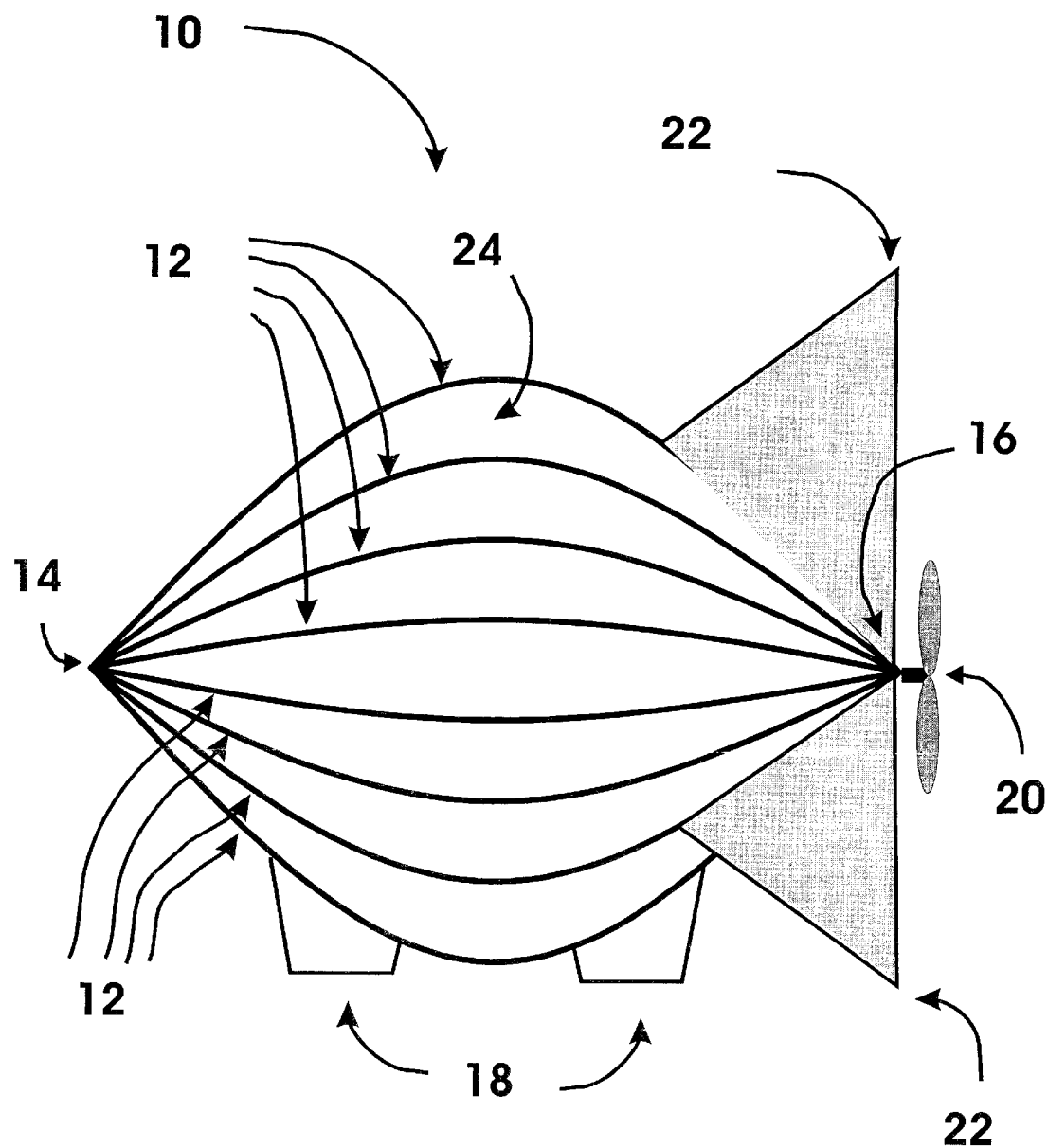
FIG. 1 is a side view of an airship hull according to the principles of the present invention.

Referring to FIG. 1, an embodiment of the basic airship 10 is shown. An outer skin 24 is tensioned around a framework of flexible members 12. The ends of the flexible members 12 are held proximately to one another at each end 14 and 16 by a hub (not shown) which may be of any suitable material (hard or flexible) so as to be able to hold the ends of the flexible members in position. Centrally, there is tensioning means for drawing the two ends 14 and 16 toward one another causing the flexible members 12 to bend and bow outwardly, tensioning the skin and forming a generally cigar shaped hollow air bag.

Tensioning means may be provided by any method which provides for drawing the two ends together in an adjustable manner. For example, a cable and turnbuckle arrangement could be used, or a belt and buckle arrangement, or a winch and cable system. The tensioning means may combine rigid and flexible portions.

Propulsion means 20 are attached in this embodiment to reinforced hard points outside of the skin 24, such as on the tail and rudder 22 or nose, or to one or more flexible members 12 or to a gondola 18 for passengers and freight. Control surfaces such as a rudder or elevators may be provided on fins 22. A non-rigid airship is only able to mount propulsion means on the gondola.

Mounting the propulsion means 20 is facilitated by a mount having suitable framing and strength to hold the propulsion means. This may require some additional internal structure to hold the mounts. The propulsion means 20 may be one or more of well known propulsion systems, including human powered propellers and propellers mounted on internal combustion engines, external combustion engines (such as a Stirling engine) or electric motors or even nuclear engines. In a preferred embodiment, the propulsion means 20 may be directionally controlled so as to provide not only forward and rearward motion, but also additional lift or down heading. For airships which obtain all or a portion of their lift from hot air, waste heat from the propulsion means 20 may be collected and directed inwardly to provide additional lift. The propulsion means may be mounted so as to allow the direction of thrust to be changed and enhance the steering capability of the airship.

The flexible members 12 may be of any suitable stiff material which does not permanently deform when bent, and when bent, provides a springing action to return to its original shape. The flexible members may be one piece or made from several separate pieces which join at the ends to form a single long member. Such materials include wood, metals such as steel or aluminum, or composites such as glass fiber and carbon fiber plastic composites. The flexible members may have an elliptical cross section (including, in the limiting case, circular), or may be any other convenient shape. In a preferred embodiment, the flexible members are held in position about the perimeter of the skin by being inserted into sleeves inside and attached to or part of the skin. This keeps the flexible members properly distributed about the perimeter of the skin. The sleeves are configured so that the flexible members 12 may be removed when the airship is to be stowed, allowing the skin to be folded.

Experimentation has shown that the proper outwardly bowed shape of the flexible members 12 under tension can more easily be accomplished if the skin is at least partially inflated with gas, such as by a fan, prior to tensioning the flexible members 12. When partially filled with air, the skin helps to cause the flexible members 12 to assume the correct shape and direction of bend under tension.

The skin 24 may be of any suitable fabric, preferably one which is airtight (or helium tight) and may be made from laminates. It is desirable that the skin 24 be resistant to bending or stretching under load, and stiff enough to reduce fabric flutter at higher speeds, which can cause drag.

Figure 2A:
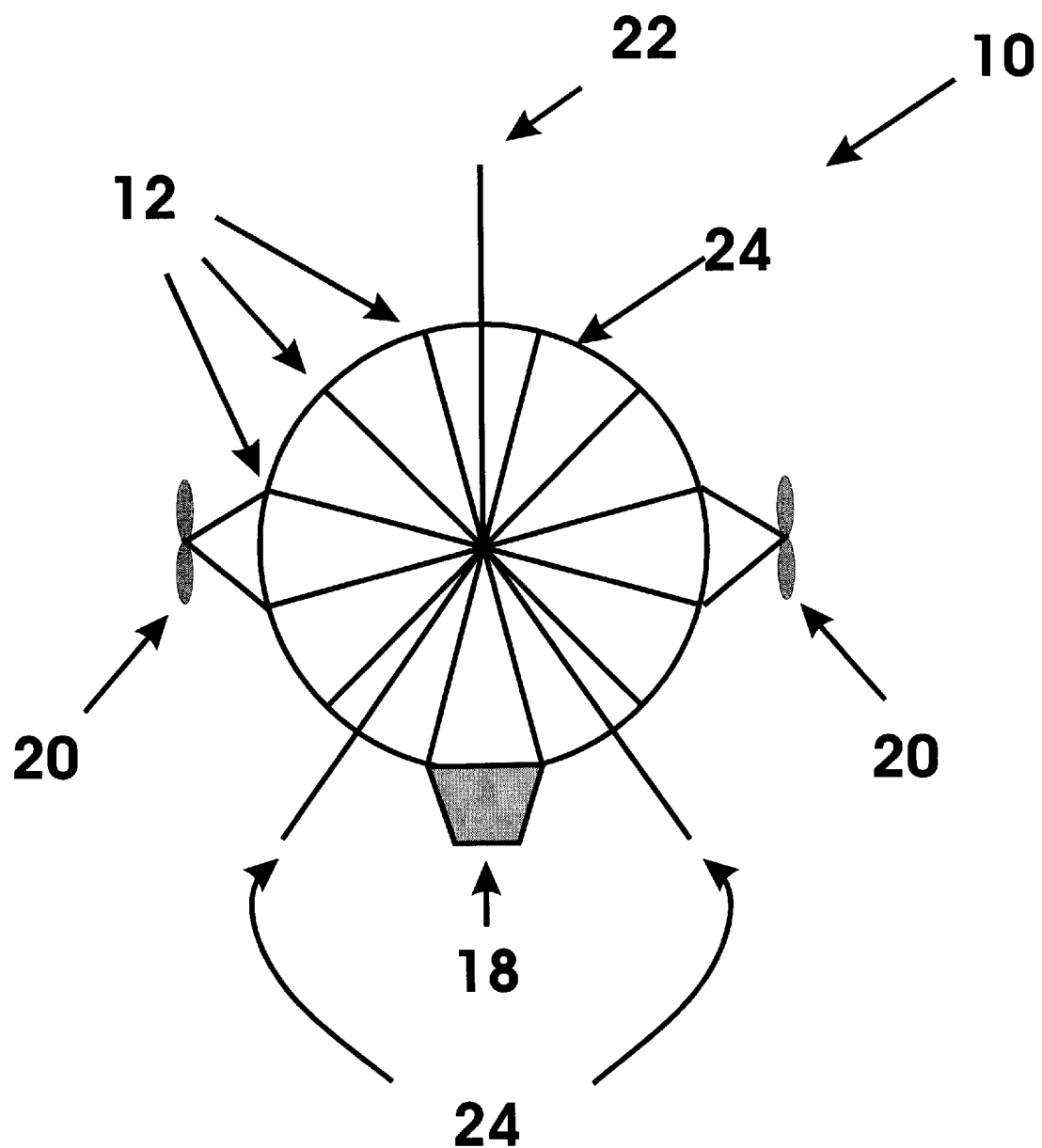
FIGS. 2A, 2B and 2C are views of an airship hull according to the principles of the present invention.
Figure 2B:
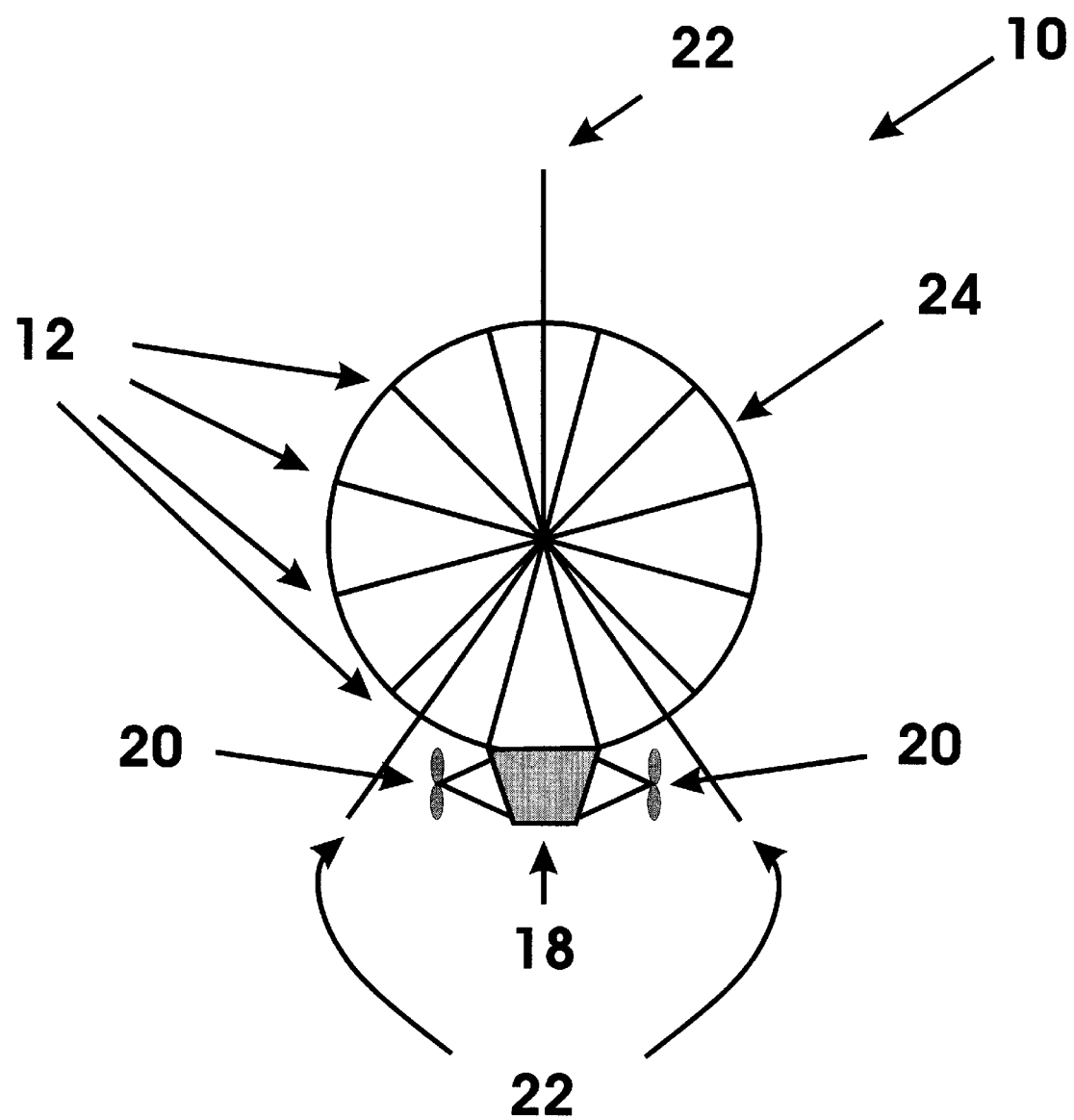
Figure 2C:
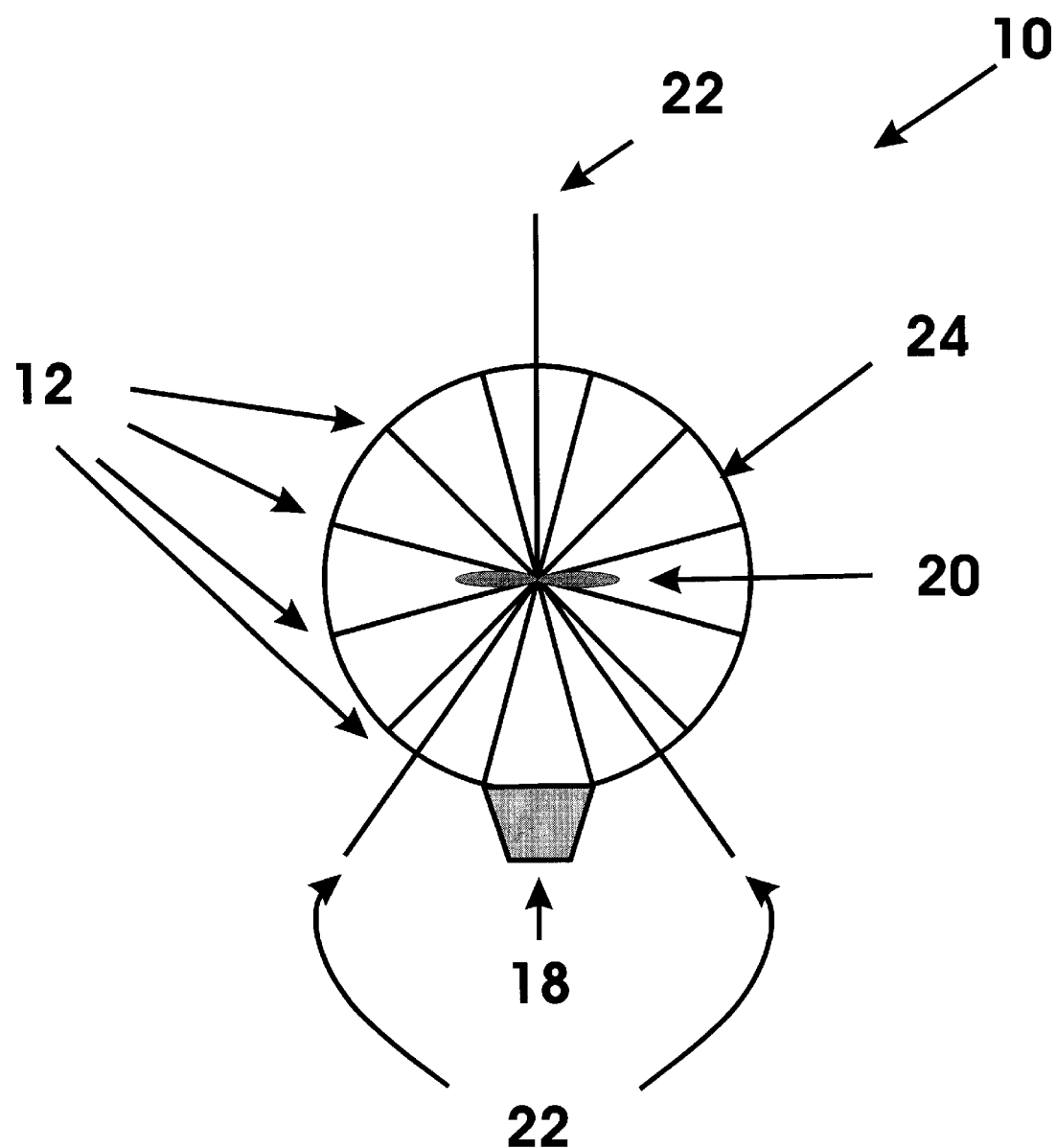

Referring to FIG. 2A, an end view of the airship 10 is shown. In this embodiment, the propulsion means 20 are mounted on either side of the airship 10 at reinforced hard points on the skin. In FIG. 2B the propulsion means 20 is shown mounted on the gondola 18. FIG. 2C shows the propulsion means 20 mounted on the tail of the airship 10. Other numbers and positions of propulsion means 20 may be utilized beneficially, depending upon size of the airship and application. Combinations of different propulsion means 20 and locations may also be employed.

Figure 3:
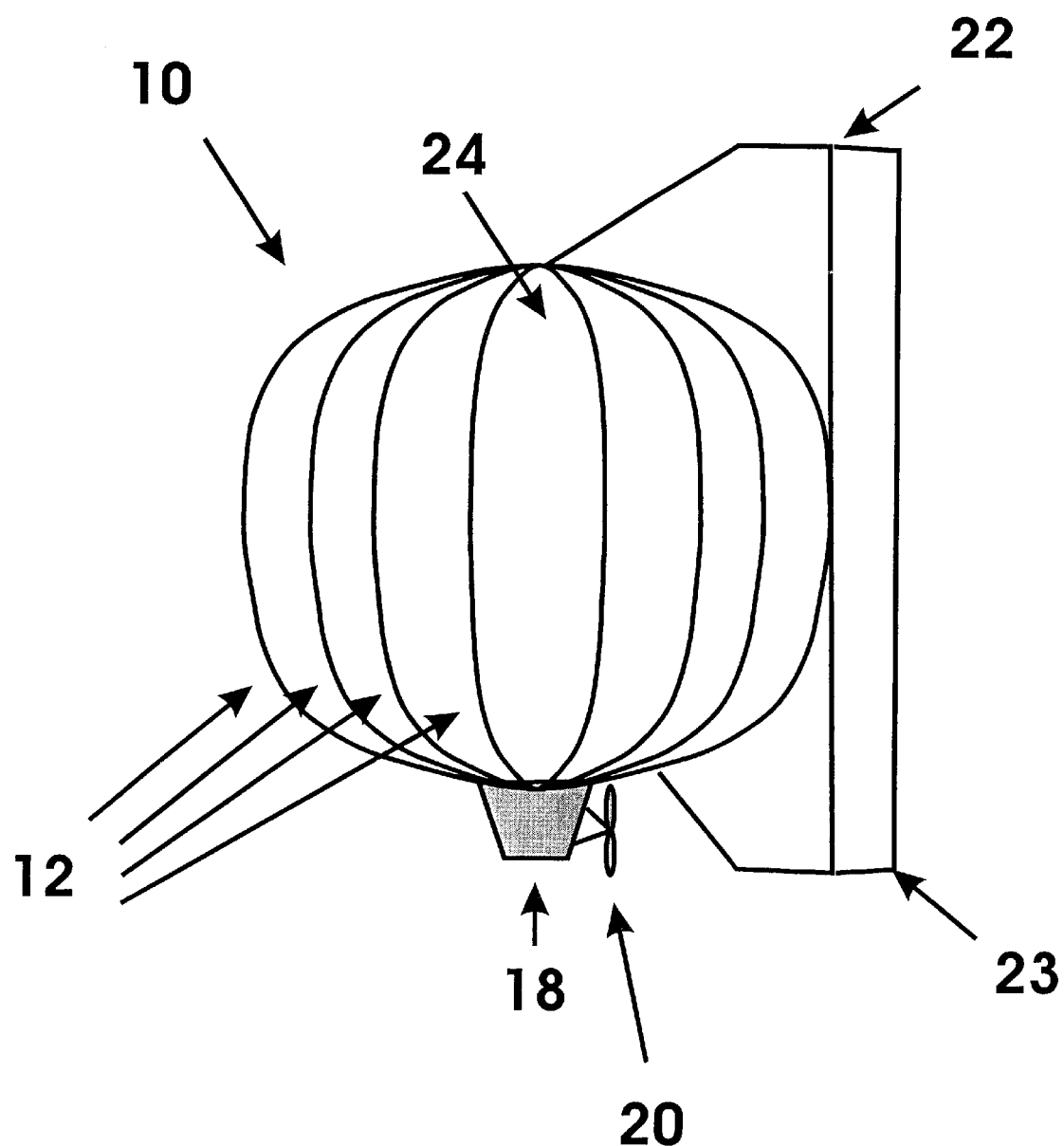
FIG. 3 is view a vertically oriented airship according to the principles of the present invention.

While an airship is most often conceived to look something like a horizontal cigar, this need not always be the case. The cigar shape may be oriented vertically, as shown in FIG. 3. In this embodiment, the airship 10 is similar to a balloon, yet has propulsion means 20. It may also be fitted with a rudder 23 to provide additional steering capability. The skin 24 is may be open so as to be able to gather heat from a heating means (not shown) to provide additional lift. The heating means may be any of a variety of means well known in the art, including but not limited to propane or other flammable gas burners or oil or gasoline or other flammable liquid burners. Experience has shown propane burners to be particularly suitable. The means may be external or internal (eliminating the necessity of an opening), although internal flammable means will require a source of fresh air supplied by ducting or similar means. External flammable heating means would require ducting, a heat exchanger of some type, or an opening in the airship skin to allow the heat to be transmitted to the internal volume of air.

Figure 4:
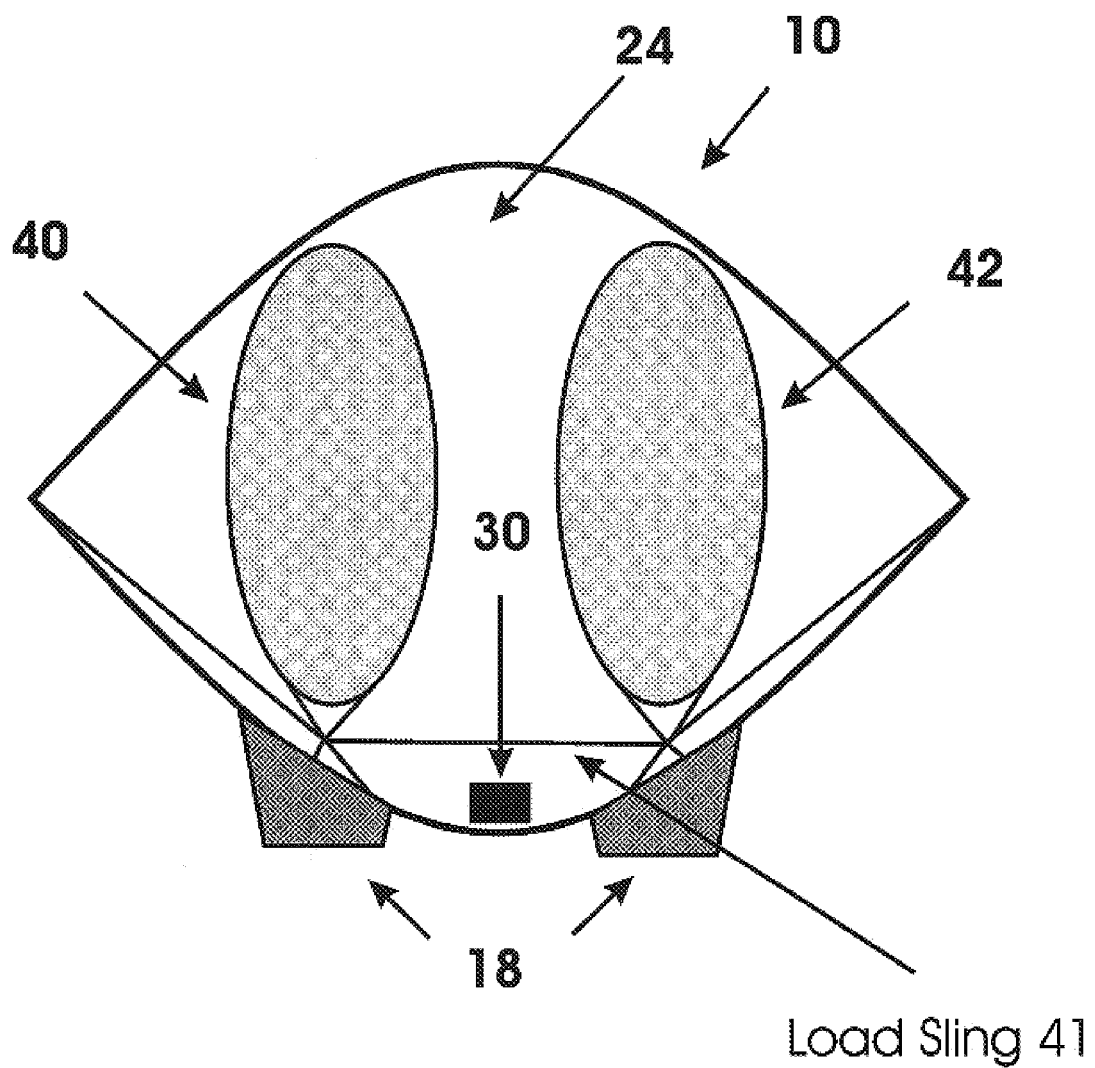
FIG. 4 is a side cutaway view of an airship with multiple gas chambers and a hot air chamber according to the principles of the present invention.

The lift does not have to be provided by a single bladder of gas or hot air: it may combine different gasses for a variety of desired results, such as stability, and lowered fuel consumption. As shown in FIG. 4, an airship 10 is shown in a cutaway view so as to be able to view the interior. For clarity, the flexible members 12 are not shown.

This particular embodiment shown has two gas bladders 40 and 42 which may be filled with a convenient lighter-than-air gas such as helium to provide a substantial portion of the lift. The balance of the internal portion of the skin 24 contains heated air, heated using heating means 30. Lift is then readily adjustable by regulating the amount of heat or cooling of the hot air contained within the skin 24. A load sling 41 supports the gondolas 18.

When not in use, the tension may be lessened and the flexible members 12 allowed to straighten out and may optionally be removed, allowing the airship hull to be rolled, folded or otherwise compacted into a relatively small space.

Figure 5:
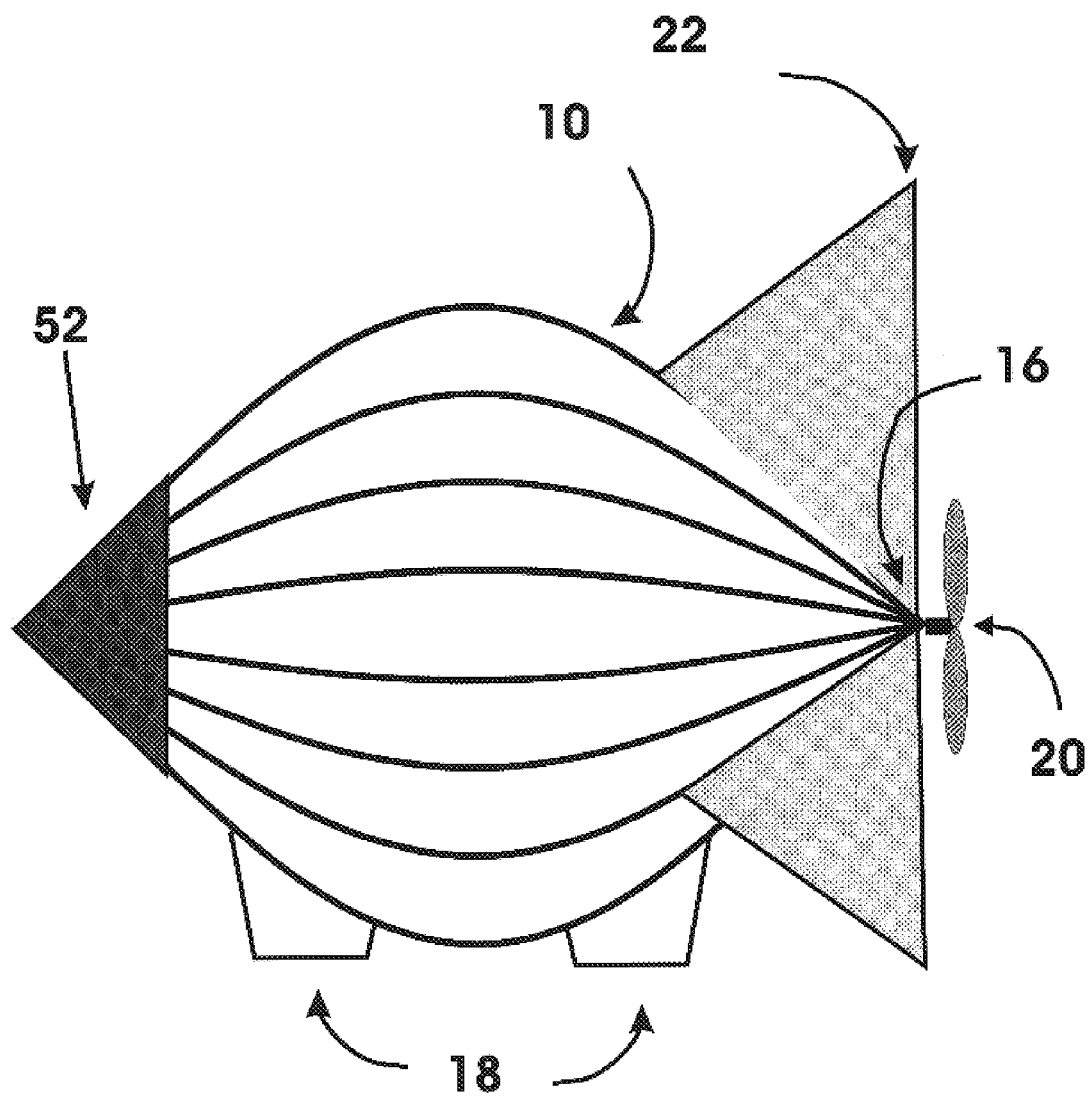
FIG. 5 is a side view of an airship with a rigid nose piece according to the principles of the present invention.

With tension applied, a horizontally oriented airship 10 may be improved, as shown in FIG. 5, by fitting the airship 10 with a stiff end cap 52 to obtain an improved aspect ratio and to reduce drag.

Figure 6B:
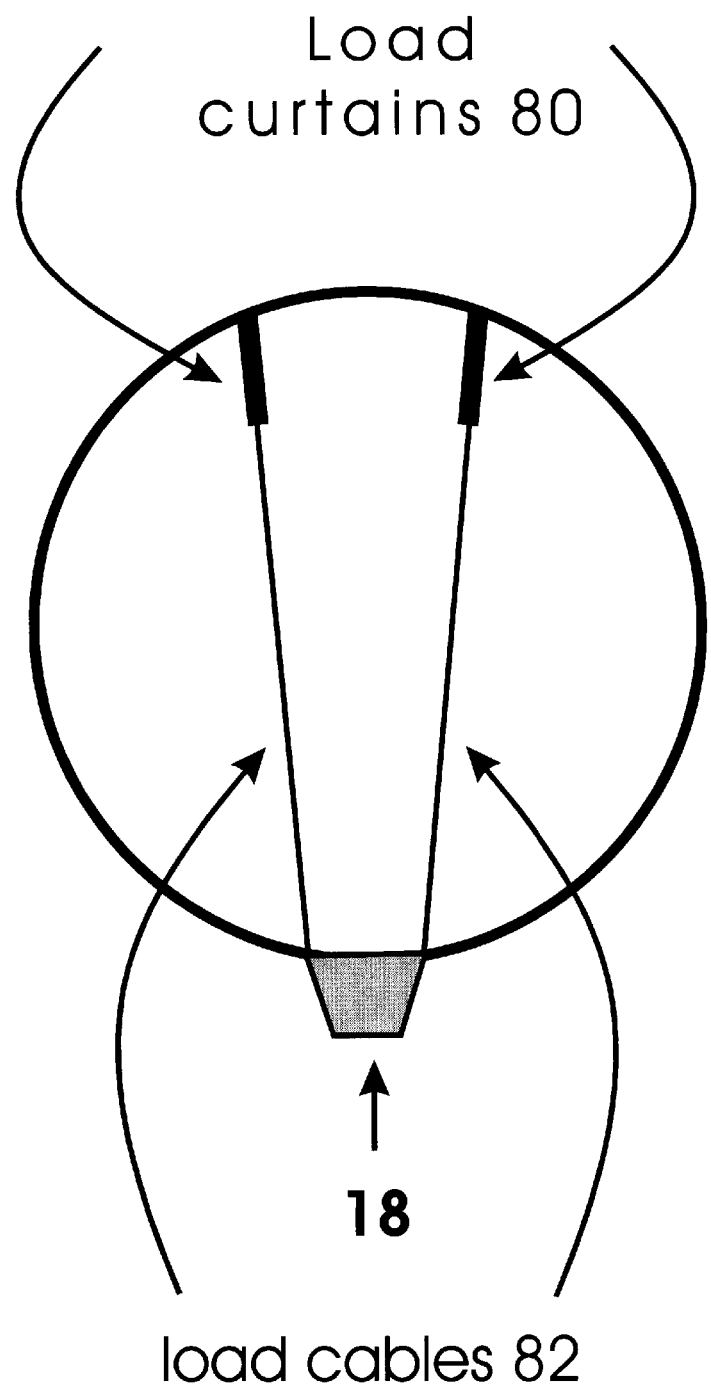

A variety of schemes may be employed to support cargo and passenger space. For example, as is shown in FIG. 6a, a pair of gondolas 18 may be supported by load cables 82 supported by load curtains 80. The load curtains 80 attach along skin, and come to points at the point of attachment with the load cables 82. FIG. 6b shows the load curtain suspension from a rear perspective, not showing the tail or flexible members 12 for clarity. Other means and combinations of means well-known in the art may be employed to suspend the loads. If the load curtains 80 and load cables 82 are removable, or are made from a suitably flexible material, they need not interfere with the stowage of the skin with the flexible members removed.

Figure 6C:
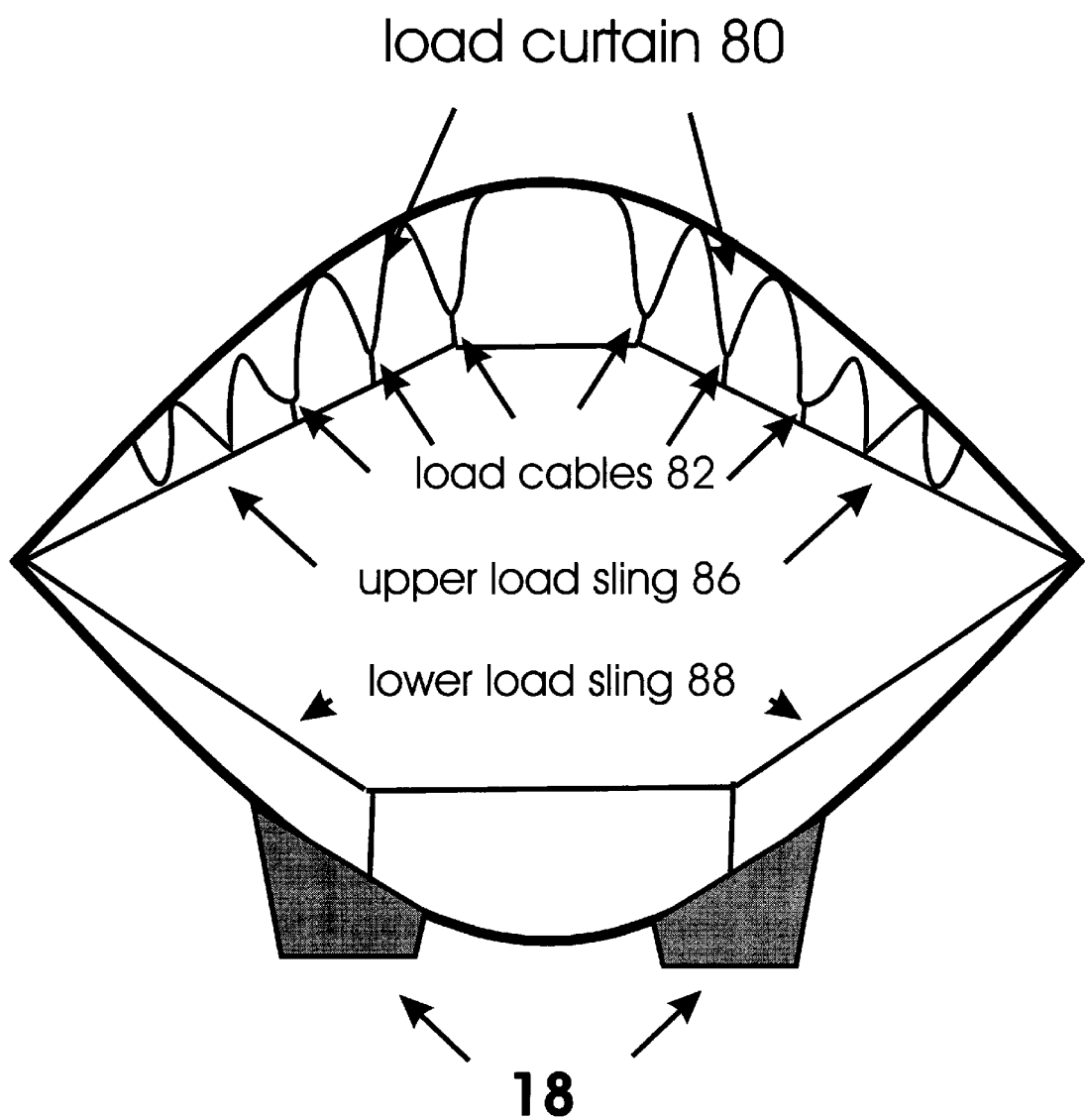

FIG. 6C shows a gondola support structure using both a load curtain 80 with load cables 82, but attached to an upper load sling 86 which is in turn attached at each end of the airship. A lower load sling 88 distributes lift from each end of the airship (thence to the upper load sling 86 and load curtain 80) to a pair of gondolas 18.

Loads may be carried externally or internally.

Figure 7:
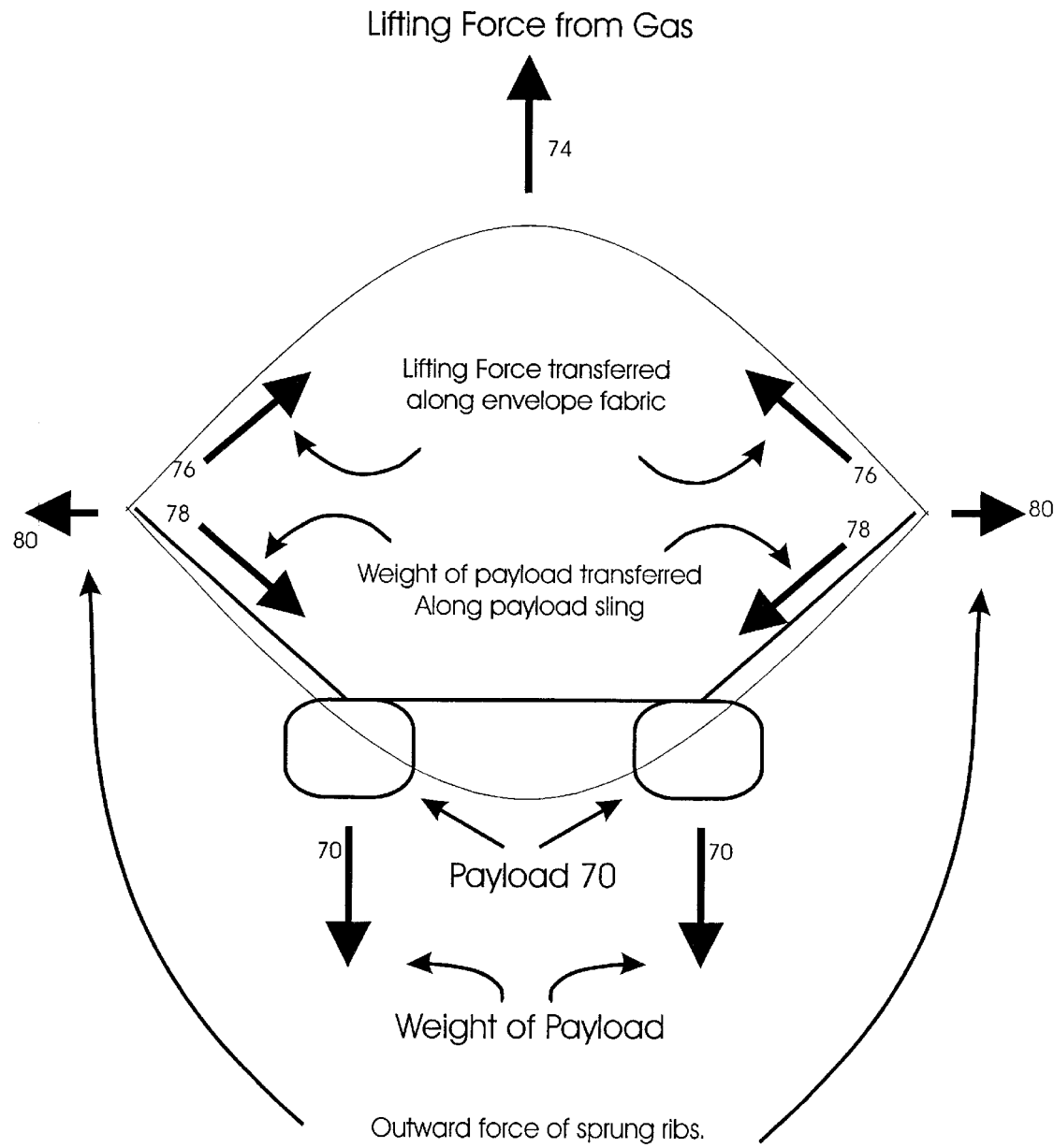
FIG. 7 is a diagram of forces acting upon an airship according to the principles of the invention.

FIG. 7 shows a diagram of forces acting upon an airship 10 according to the principles of the invention. Payloads 70 apply a downward force 72. The lifting force 74 from the gases within the skin exactly counterbalance the downward forces 72 when at a steady altitude. The lifting force 74 is transferred along the skin 24 at 76, and the downward force is applied to the skin at 78. The flexible members (not shown) apply an end-to-end force 80 which is counterbalanced by the tensioning means (not shown in FIG. 6).

In one embodiment of a small airship according to the principles of the present invention, the gondola 18 is detachable from the skin, and the propulsion means 20 is mounted on the gondola. In this configuration, the airship hull can be readily folded and stored, and the gondola and propulsion means stored separately, taking up a minimum of storage space.

Modifications and substitutions by one of ordinary skill in the art are considered to be within the scope of the present invention, which is not to be limited except by the following claims.

The invention claimed is:

1. A foldable airship hull comprising
a gastight skin;
a plurality of flexible members disposed about and generally perpendicular to a perimeter of the skin, said flexible members being held at at least one point to the skin and said flexible members having first and second ends, said first ends being fixed in place proximate to one another and said second ends being fixed in place proximate one another; and
at least one tensioning member which is lengthwise adjustable, said tensioning member being attached at a first point to said first end of the flexible members and at a second point to said second end of the flexible members so as to draw the said first ends of said flexible members toward the said second ends of said flexible members and thereby elastically bending the said flexible members outwardly, forming, with the skin, a stiff body.

2. The foldable airship hull of claim 1 wherein the skin further comprises a plurality of sleeves, and wherein at least one of the said flexible members is contained within said sleeve.

3. The foldable airship hull of claim 1 further comprising at least one gondola, said at least one gondola being suspended from at least one chosen from the group consisting of said first and second ends, the skin fabric, the flexible members and a load curtain.

4. The foldable airship hull of claim 1 further comprising means for heating a volume of gas within the skin.

5. The foldable airship hull of claim 4 wherein said heating means is disposed in an interior of the skin.

6. The foldable airship hull of claim 4 further comprising at least one gas-tight flexible vessel disposed within the skin.

7. The foldable airship hull of claim 1, further comprising propulsion means to control movement of the airship and at least one mounting means for mounting the propulsion means.

8. The foldable airship hull of claim 7 wherein at least one of said propulsion means is mounted proximate to an outer surface of the skin.

9. The foldable airship hull of claim 7 wherein at least one of said propulsion means is on the gondola.

10. The foldable airship hull of claim 1, further comprising at least one stiff cone covering one of the first or second ends of the flexible members.

11. The foldable airship hull of claim 1 wherein at least one of the flexible members is comprised of a plurality of segments which are attachable one to the other.

12. The foldable airship hull of claim 1 wherein the flexible members are held together at an end by a rigid frame.

13. The foldable airship hull of claim 1 wherein the tensioning member is lengthwise adjustable.

14. The foldable airship hull of claim 1 where at least one of the flexible members is made with metal.

15. The foldable airship hull of claim 1 where at least one of the flexible members is made with a glass fiber composite.

16. The foldable airship hull of claim 1 where at least one of the flexible members is made with carbon fiber composite.

17. The foldable airship hull of claim 1 where at least one of the flexible members has an elliptical cross section.

18. The foldable airship hull of claim 1 where at least one of the flexible members is made with aluminum.

19. A method of constructing a foldable airship hull comprising the steps of:

providing an airtight skin having a generally cylindrical shape tapered at at least one end;
providing a plurality of flexible members removably disposed about and generally perpendicular to a perimeter of the skin, said flexible members being held at at least one point to the said skin and further said flexible members having first ends and second ends, said first ends being fixed in place proximate to one another and said second ends being fixed in place proximate to one another;
providing a lengthwise adjustable connector attached at a first point to the said first end of the flexible members and attached at a second point to said second end of said flexible members so as to tension said flexible members by drawing the said first ends of said flexible members toward the second ends of said flexible members and thereby elastically bending the said flexible members outwardly forming, with the skin and flexible members, a substantially rigid body.

20. The method of claim 19 wherein the skin further comprises a plurality of sleeves, and the further step of placing at least one of the flexible members within said sleeve and holding said at least one flexible member in place.

21. The method of claim 19 further comprising a gondola, and the additional step of suspending the said gondola from at least one of said first and second ends.

22. The method of claim 19 further comprising heating a volume of gas within the skin by heating means.

23. The method of claim 19 with the additional steps of providing an opening on an underside of the skin, placing the said heating means externally to the skin and proximate to the said opening, and using the said heating means for heating a volume of gas within the skin.

24. The method of claim 19 further comprising at least one gas-tight chamber disposed within the skin and which chamber can enclose and hold a volume of a gas.

25. The method of claim 19, further comprising the step of providing propulsion means to control movement of the airship and at least one mounting means for mounting the propulsion means.

26. The method of claim 25 wherein at least one of said propulsion means is mounted on an outer surface of the skin.

27. The method of claim 21 further comprising the step of suspending at least one gondola using at least one load curtain.

28. The method of claim 19, further comprising the step of providing at least one generally conical firm covering over one of the first and second ends of the flexible members.

29. The method of claim 19 wherein at least one of the flexible members is comprised of a plurality of segments which are able to be assembled to form a single flexible member.

30. The method of claim 19 wherein the flexible members are held together at an end by a rigid frame.

31. The method of claim 19 further comprising the step of loosening the tensioning means whereby the flexible members straighten and may be rolled up together with the skin.

32. The method of claim 19 wherein at least one of the flexible members is made with a glass fiber composite.

33. The method of claim 19 where at least one of the flexible members is made with carbon fiber composite.

34. The method of claim 19 wherein at least one of the flexible members has an elliptical cross section.

35. The method of claim 19 further comprising the step of at least partially inflating the skin before tensioning the flexible members.

36. A foldable airship comprising a generally tubular skin closed at each of a first and a second end, forming an envelope containing a volume of gas, and further having a plurality of sleeves about a perimeter of the said skin and running generally perpendicularly to said perimeter about a longitudinal axis of said skin;

a plurality of flexible members, disposed within the said sleeves;

a first connector at a first end of the said skin holding a first end of each of the said plurality of flexible members proximally to one another, and a second connector at a second end of the said skin holding a second end of each of the said plurality of flexible members proximally to one another;

a third connector between the said first connector and said second connector, which third connector is lengthwise adjustable so as to be able to draw the said first connector and said second connector toward one another, thereby putting the flexible members in tension and bowing in a generally outwardly direction from the said longitudinal axis of the said skin so as to tension the said skin about the said flexible members forming a substantially rigid volume.

* * * * *